Patented Aug. 28, 1945

2,383,451

UNITED STATES PATENT OFFICE 2,383,451

TREATMENT OF FRESH FRUITS AND VEGETABLES IN PREPARATION FOR MARKET

Charles De Witt Cothran, Pomona, Calif., assignor to Brogdex Company, Pomona, Calif., a corporation of California No Drawing. Application July 4, 1942, Serial No. 449,806

20 Claims. (Cl. 99—168)

This invention relates to treatment of fresh fruits and vegetables in preparation for market; and it relates more particularly to improved waxy coating compositions and the manufacture thereof, as well as the application thereof to fresh fruits and vegetables in order to enhance their attractiveness and marketability. The expression fresh vegetable produce is hereinafter employed broadly to include both fresh fruits and vegetables.

Within the last twenty years, the application of waxy coating compositions by various methods to certain fresh fruits, and also to fresh vegetables in lesser degree, has become common practice in the preparation and packing thereof at the producing localities for shipment to marketing centers. In the commercial handling of citrus fruits especially, as well as of cantaloupes and tomatoes, that practice has become widespread.

The waxy coating compositions so employed and the method of manufacturing them vary considerably in specific character, as do also the methods of applying them to vegetable produce and the results achieved. Reduction to at least some extent of the rate of withering or shrinkage normally undergone by fresh vegetable produce while being shipped from the place of production to market and distributed to consumers is generally an important objective sought and, depending upon the nature of the waxy composition and its mode of application, attained in greater or less degree. For withering or shrinkage control, application of a relatively soft, low-melting wax, such as paraffin wax, is most effective.

One commonly employed method of waxing fresh vegetable produce involves applying thereto an aqueous emulsion of waxy material, following a preliminary washing or other cleansing treatment of the produce. It is well known that the acceptability of the results obtainable by application of a given aqueous wax emulsion to fresh vegetable produce depends rather critically upon what its condition may be, with respect to such characteristics as stability, surface tension and pH value, at the time it is applied to the produce to be waxed, at which time the actual waxy content of the emulsion is usually on the order of 2 to 4 per cent. As a rule, in order that the emulsion may properly wet the surface of the fruit or vegetables and spread uniformly thereover, the surface tension of the emulsion at such operating concentration should ordinarily not be substantially higher than about 37 or 38 dynes per centimeter ("Cenco" DuNouy surface tensiometer, water=72.75 dynes), and considerably lower surface tensions, within a range of from 28 to 35 dynes, give better results as a general rule. The pH value should be kept within the approximate range of 8.0 to 10.0. The optimum pH value for a given emulsion depends somewhat upon the specific kind of soap employed as emulsifying agent.

Although the operating or working emulsions (i. e. the emulsions as actually applied to the produce) usually have a wax content or concentration of between 2 and 4 per cent, it is highly desirable for reasons of economy that, as manufactured and distributed, the emulsions be in the form of "emulsion concentrates" containing at least 15 to 18 per cent or more of wax and freely fluid so that they can be easily run into drums or like containers at the place of manufacture for shipment to users; and that such concentrates can be depended upon to remain fluid during long periods in transit to destination and in storage prior to dilution for use, so that when needed for use they can then be readily poured out of the containers and diluted with water to the desired working concentration of the lower order above indicated. It is obvious that the emulsion concentrates should be of such nature as to successfully undergo such shipment, storage and dilution without "breaking," and to give upon dilution working emulsions having the desired critical characteristics above referred to. These requirements are somewhat exacting and are not always easy to meet.

In addition to shrinkage control, a further objective sought in wax-coating certain kinds of produce, for example oranges, tangerines, as well as some other fruits and vegetables, is to provide their surfaces with a pronounced gloss or shine. This is in order to satisfy an established trade preference and thereby to realize higher market prices for the produce. In order to attain this further objective, it has long been common practice to employ carnauba wax in such produce-treating emulsions, either as the sole waxy component thereof or in conjunction with paraffin or other waxy material in variable relative proportions. Especially where carnauba constitutes the whole or a major part of the total waxy content of the emulsion, its high melting point and hardness, as well as certain other characteristics, render it very effective in emulsions for producing coatings characterized by high surface gloss or luster, including emulsions of the "dry bright" type which give such a glossy coating merely upon drying and with little or no rubbing or brushing of the dried coating. But such emulsions having high carnauba wax content give coatings on vegetable produce that are notably deficient in shrinkage control and far inferior in this respect to emulsions whose waxy component is wholly or largely a considerably softer and lower-melting wax, such as paraffin, an especially serious drawback where shipments of the waxed produce must be in transit more than two or three days before reaching the marketing destination. This consideration, as well as the relatively high cost of carnauba wax even in normal times, let alone its present abnormal cost, led long ago to search by investigators skilled in the art of waxing fresh vegetable produce in order to find a substitute for carnauba wax in produce-treating emulsions which would be satisfactory, primarily in respect to the production of coatings with a high gloss or shine and which, in addition, might perhaps yield coatings having better protective or shrinkage-control properties than coatings high in carnauba wax. In this connection, various relatively high-melting waxes were proposed and to some extent tried, but their use was found unsatisfactory or impracticable on one ground or another, such as a tendency to give unstable emulsions, or tackiness of the coating produced on the fruit or vegetable, for example.

The present applicant has found that by proceeding in accordance with the principles hereinafter disclosed, it is possible to utilize ouricury wax as the basis or as a substantial component of aqueous wax emulsions that are eminently satisfactory for waxing fresh vegetable produce and that are in some respects superior to carnauba wax emulsions for that purpose.

Ouricury wax, which is imported from Brazil, is one of a group of commercial waxes known as palm tree waxes, and is derived from palms of the species *Cocos coronata* and *Attalea excelsa*. Although different commercial lots vary somewhat in specific identifying properties, ouricury wax has a high melting point and certain other characteristics causing it superficially to resemble and sometimes to be mistaken for carnauba wax, another palm tree wax which is derived from quite a different species of palm, *Copernicia cerifera*. It would seem reasonable to suppose that ouricury could probably be readily substituted for carnauba, with satisfactory results, in aqueous produce-waxing emulsions of the latter prepared as hereinabove. Surprisingly enough, however, such is not the case. Attempts to do so yield emulsions that are either quite inoperable and utterly worthless for waxing vegetable produce or, at the best, lack the property of giving coatings the high gloss which is so much desired and for the attainment of which packers and shippers have so long been compelled to use carnauba wax.

For example, among carnauba wax emulsions that have been highly satisfactory and widely used in waxing fresh vegetable produce, because they dry with a very high gloss, are those prepared with the aid of a triethanolamine soap as the emulsifying agent. Such emulsions, wherein the wax content is wholly or largely carnauba wax, can be prepared without great difficulty as relatively concentrated emulsions of the oil-in-water type that are stable and stand shipment well to any desired place of use. There they can readily be diluted to the much lower operating concentration desired, and the resultant diluted emulsions are stable and also satisfactory in other respects, including surface tension and pH values. In preparing the concentrated emulsions, it is only necessary, for example, to heat to a suitable degree of fluidity a mixture of a suitable fatty acid, such as oleic acid, with the carnauba wax and such other wax, if any, as is to be employed in conjunction therewith, and then to run into this hot fluid mixture a hot aqueous solution of triethanolamine, with stirring, the triethanolamine soap thus being formed in situ with production initially of an emulsion of the water-in-oil type. Adding more water in small increments results eventually in causing inversion of the emulsion into one of the oil-in-water type which becomes quite fluid with wax concentrations even as high as 30–35 per cent where the wax content is wholly carnauba or practically so. In general, preparation of such carnauba wax emulsions with a wax content or concentration of 15 to 18 per cent or more requires the use of from about 3.5% to 4% of oleic acid (133 to 152 grams per gallon of emulsion) and from about 1.75% to 2.5% of triethanolamine (66 to 95 grams per gallon). Using commercial grades of triethanolamine and oleic acid, these proportions give triethanolamine soaps that are either approximately neutral or that contain some excess of triethanolamine. The saponifying reaction proceeds smoothly and, while the resultant initial reaction mass is fairly thick and viscous, dilution thereof with water to give satisfactory "emulsion concentrates" whose wax content or concentration ranges from 35 down to 15 per cent, for example, can be readily accomplished by proceeding in the manner described. Furthermore, these emulsion concentrates are freely fluid and easily diluted with more water to the desired lower operating concentrations.

If, however, it be attempted to prepare emulsions of ouricury wax with the aid of triethanolamine, following the same procedure just referred to, the results obtained are radically different. Upon adding the triethanolamine solution to the hot wax-oleic acid mixture to effect saponification, an almost solid reaction mass of cheese-like consistency is usually formed at once. This can be diluted with water, if at all, only with great difficulty; and even when diluted to a wax concentration as low as 15 per cent, the emulsion is ordinarily practically solid and very sticky. In fact, it often seems to be still a water-in-oil emulsion, inversion into the oil-in-water type of emulsion having apparently failed to occur in the diluting operation. Apart from other considerations, such a non-fluid emulsion concentrate would be at a disadvantage commercially, in competition with a freely fluid concentrate, for reasons already explained hereinabove. Furthermore, the operation of diluting a non-fluid concentrate is in itself much more difficult to accomplish satisfactorily than is the operation of diluting a freely fluid emulsion concentrate.

As will more fully appear hereinafter, it is possible, by virtue of the present invention, to prepare aqueous emulsions of ouricury wax with the aid of a triethanolamine soap emulsifier that are suitable for use in waxing fresh vegetable produce, although these are not at present regarded as representing the best embodiment of the invention. Their preparation involves a technique quite different, however, from that hereinabove described for triethanolamine emulsions of carnauba wax. Among other things, it is essential in making triethanolamine emulsions of ouricury wax that the proportion of triethanolamine and fatty acid, taken together, relative to the wax, shall be considerably higher than when making triethanolamine emulsions of carnauba wax.

The behavior of the ouricury wax toward alkali metal hydroxides, such as caustic soda, is also quite different from that of carnauba wax toward these reagents. Employing carnauba wax, an excellent emulsion can be made by adding a strong caustic soda solution to a hot fluid mixture of carnauba wax with a fatty acid, such as oleic acid, while agitating the mass, to effect the desired in situ saponification, this reaction occurring smoothly and without violence; then adding hot water in successive small increments, with continued agitation, until the emulsion is diluted to the desired concentration, for example 18 per cent. After the first few small amounts of hot water have been added, the wax-soap mixture begins to get thick and greasy. At this stage, the emulsion is still of the water-in-oil type. Further successive additions of hot water cause the emulsion to invert into the oil-in-water type and to become much thinner, so that by the time it has been diluted to 18 per cent wax content, the emulsion is quite fluid. But if ouricury wax be substituted for carnauba in the hot wax-oleic acid mixture, the other conditions of operation remaining the same, a violent reaction ensues, with sudden development of so much heat as to drive practically all of the water from the mixture in clouds of steam; and when more water is added in accordance with the normal procedure, the wax and soap promptly foam up over the top of the mixing vessel. Moreover, if precautions be taken to prevent such loss of moisture and "boiling-over" from occurring, as by conducting this initial step in a tightly closed reaction vessel, the thickening of the resultant wax-soap mixture that occurs in the case of carnauba wax upon the subsequent addition to said mixture of the first few small amounts of hot water, does not occur until much later (i. e. after considerably more of the hot water has been added in small increments), and is then accompanied by generation of considerable additional heat. Also, this thickening then goes much further until the ouricury emulsion becomes substantially cheese-like in consistency. When this occurs, the emulsion can be further diluted only with the greatest difficulty.

The present invention provides a way of overcoming the difficulties noted. It includes as an important feature the employment of a substantially larger molar proportion of alkali metal hydroxide in the initial saponification mix, relative to the fatty acid present, than is desirable when preparing carnauba wax emulsions with the aid of alkali metal soap emulsifier as hereinabove described, but under conditions preventing too rapid reaction and undue thickening of the mass. The use of such higher proportion of alkali metal hydroxide in preparing carnauba wax emulsions results in emulsions having excessively high surface tension. But in preparing ouricury wax emulsions in accordance with the invention, this undesirable effect is not produced, the emulsions being eminently satisfactory for produce-waxing purposes and, indeed, constituting what is at present regarded as the best embodiment of the invention.

In the further explanation of the principles of the invention given hereinafter, other striking differences between ouricury and carnauba waxes, as well as between their emulsions and the methods of preparing the same, will be brought out; but the foregoing suffices amply to show that the two waxes are in fact not equivalent or interchangeable in such emulsions, and that the technique necessary to employ in preparing ouricury emulsions is quite different from that heretofore known and employed in the manufacture of carnauba wax emulsions for waxing fresh vegetable produce.

In order to afford a further understanding of the principles of the invention, certain typical embodiments thereof that have been found satisfactory in practice will now be described in detail, it being understood, however, that these are merely illustrative of various forms which the invention may take.

The ouricury wax employed exhibits the characteristic brown color of this variety of wax, considerably darker than carnauba wax. The crude wax commonly contains around 1 to 1.5% moisture and in the neighborhood of 5 to 7% of fiber, sand, and like foreign matter. When melted, it shows a much higher viscosity than melted carnauba wax, and it has a characteristic resinous odor readily distinguishable from that of melted carnauba and other waxes, becoming somewhat unpleasant after a few minutes. Typical samples show a melting point within the range 84°–87° C., and specific gravity 1.02–1.03, one of the rare instances where the specific gravity of a natural wax exceeds unity.

For best results, it is advisable to use refined ouricury wax. Refining can be effected by melting the crude wax and heating it to about 115° C., then adding a filter aid in the form of diatomaceous earth and forcing it through a suitable filter, such as a horizontal plate Sparkler filter, under 50 pounds pressure.

In a particularly desirable embodiment of the invention an emulsion concentrate having an 18 per cent wax content and weighing substantially 3800 grams per gallon is prepared from the following manufacturing formula, the approximately indicated percentages being by weight:

|  | Per cent | Grams per gallon |
| --- | --- | --- |
| Refined ouricury wax | 13.5 | 512 |
| Paraffin wax | 4.5 | 170 |
| Oleic acid | 7.2 | 272 |
| Sodium hydroxide | 1.0 | 40 |
| Water | 73.8 | 2,806 |
|  | 100.0 | 3,800 |

The paraffin, oleic acid and sodium hydroxide are of good commercial standard grades of relatively high purity, a sufficient weight of the commercial oleic acid and sodium hydroxide being employed to give the weights of the pure reagents indicated in the above formula.

The waxes and the oleic acid are placed in a mixing kettle equipped with a mechanical stirring device, and the kettle heated to melt the waxes and effect thorough blending with the oleic acid, and the melt being then heated to a sufficiently higher temperature (about 100° C.) to render it thinly liquid. Speaking in terms of 1 gallon of emulsion, the 40 grams of sodium hydroxide used in the above typical formula are dissolved in 200 cc. of water, giving an approximately 22° Baumé solution at 18° C. This moderately concentrated caustic soda solution, which should be substantially cooler than the aforesaid hot melt and most desirably at a temperature in the neighborhood of 50° C. or even as low as 40° C., is run rapidly into the hot liquid mixture of waxes and oleic acid with vigorous stirring or agitation. After the first half of the caustic soda solution has been added, the wax mixture is still quite fluid, there being little change up to this point. When all the caustic soda has been added, the wax mixture becomes thicker although still fluid. If no further addition of water is made at this point and the water in the mixture is allowed to evaporate, the mass becomes more fluid. However, it is better practice to begin adding the water of the formula immediately following the addition of the caustic soda solution and mixture thereof with waxes. This water should be almost boiling hot and the first part of it should be quickly added in small increments of about one-quarter to one-half percent each, the rest being then added in relatively large and nearly continuous additions, as distinguished from the procedure hereinabove described for manufacture of emulsions employing carnauba wax but otherwise of similar formula. Although there is a progressive thickening of the mass until about 20 per cent of the total water has been added, such thickening does not become excessive. At this stage, the mass is about the consistency of heavy grease, very dark in color and brilliant. Further relatively large and continuous additions of water thin the mass slightly, but as inversion of the emulsion often occurs at about this point, the color becomes lighter, the emulsion loses its brilliance, and becomes of a somewhat pudding-like consistency. A pronounced thinning of the mass should take place when about 70 per cent of water has been added. Hot water may now be added continuously with constant agitation until the desired degree of dilution has been attained. When all the water has been added, the emulsion has a dark color.

By proceeding in the above described manner, it will be found that the increased thickening of the mass characteristic of near approach to the inversion point occurs somewhat later than in the procedure hereinabove described for the preparation of carnauba wax emulsions; also that such thickening does not proceed to the point where the emulsion becomes cheese-like in consistency and extremely difficult to dilute further, as would be true if the water added after the saponification were added in small increments in the manner described for carnauba emulsions. On the contrary, the inversion occurs smoothly; and thinning down to the final 18 per cent wax concentration, although it does not take place as readily as in the case of carnauba emulsions, can be accomplished without serious difficulty. But if the proportion of caustic soda employed in the formula is substantially less than 1% (i. e. about 38 grams per gallon of emulsion concentrate), the resultant 18 per cent emulsion concentrate will not be fluid at ordinary room temperature. At least about 35 to 36 grams of caustic soda per gallon of an emulsion of 18 per cent wax concentration must be used in the manufacturing formula if an emulsion concentrate having the necessary fluidity is to be obtained, unless some additional expedient such as that presently to be described be resorted to.

By way of comparison, it should be noted here that an emulsion having the same manufacturing formula as in this illustrative example, but employing carnauba wax instead of ouricury, would have such a high surface tension as to render it unsuitable for waxing fresh vegetable produce. For practical purposes it would not be permissible to employ more than about 34 grams of caustic soda per gallon, as a maximum, in such a carnauba wax emulsion. Since this is substantially less than is sufficient to combine with all the fatty acid (oleic acid) present, it follows that the described ouricury wax emulsion always contains more, and with advantage considerably more, soap (sodium oleate) than the maximum permissible for a carnauba wax emulsion of otherwise similar composition.

Where for any reason inversion of the ouricury wax emulsion into the oil-in-water type fails to occur at the proper stage in the manufacturing procedure, with resultant failure to attain the desired increased fluidity of the emulsion, resort may be had to the expedient of adding ammonium hydroxide (10% strength) in proportion depending upon the circumstances, but usually between 10 and 100 cc. per gallon of emulsion. This has the effect of immediately causing the emulsion to become thinner and darker in color, apparently through compelling the inversion to occur. Such addition has the undesirable effect of causing the emulsion to smell strongly of ammonia, in addition to increasing both surface tension and alkalinity to an extent which may in some instances destroy or seriously affect the utility of the emulsion for waxing fresh vegetable produce. This expedient should therefore be resorted to only in cases of emergency and where it can be used and still obtain an emulsion suitable for the purposes in view.

The ouricury emulsion wax concentrate, manufactured as described in the foregoing specific illustrative example, is of excellent stability and hence stands shipping to distant points and prolonged storage under normal commercial conditions without breaking down or solidifying. When further diluted at the packing house to a working concentration of 3%, assuming dilution water of not more than of average hardness, the working emulsion has a surface tension of around 34 to 36 dynes and pH around 9.0 or slightly higher. These figures are usually not far different from the corresponding figures for the emulsion concentrate.

It should be noted that, in manufacturing the emulsion as described in the foregoing typical example, the volume or concentration of the caustic soda solution employed in the initial saponifying step is somewhat critical within reasonable limits in that it determines to a considerable extent the quality of the finished emulsion concentrate. If the volume is too small (say, less than 100 cc.), there will be a salting out effect with gummy chunks of wax and soap persisting even in the finished emulsion. On the other hand, if the volume is too great (e. g. 350 cc.), the portion of the solution added during the latter part of the mixing operation does not seem to react with the oleic acid, and the physical condition of the emulsion is similar to one which contains too little alkali.

This 3% working emulsion may be applied to fruits and vegetables in any suitable manner, as by dipping or spraying, in accordance with well understood procedures. The emulsion wets the treated articles well and spreads uniformly over their surfaces, giving a lustrous or glossy finish merely upon drying, although the dried coating may be further burnished if desired by the use of the usual polisher brushes. Furthermore, it is found that the degree of shrinkage control afforded by these coatings is somewhat better than is afforded by coatings resulting from the application of emulsion otherwise the same in composition but containing carnauba wax instead of ouricury.

It may be here noted that the ouricury wax emulsion of the particular manufacturing formula given in the foregoing example has been used with notable success in wax-coating cantaloupes, but is also well adapted for use on citrus fruits as well as other vegetable produce.

It will be understood that if it is desired to manufacture ouricury wax emulsion of higher concentration than 18 per cent wax content, this can be done by using correspondingly larger proportions of alkali metal hydroxide than the proportion specified in the above illustrative example.

Excellent emulsions of ouricury wax, employing a triethanolamine soap as emulsifying agent can also be made in accordance with the principles of the invention, and they dry with a very high gloss when employed in the coating of fresh vegetable produce in the manner herein described. For example, a desirable manufacturing formula may be the same as the specific example already given hereinabove, but substituting 150 grams of triethanolamine for the 40 grams of sodium hydroxide therein specified. The resultant emulsion concentrate is freely fluid, stable and, when employed at the usual working concentration of around 3%, dries very bright on fruit, covering well and drying quickly. The amount of triethanolamine employed is greater than is required to react with the fatty acid to form a neutral soap. This is not disadvantageous, but where production of such neutral soap is required, the proportion of triethanolamine employed should be approximately 130 grams, assuming that the proportion of oleic acid remains at 272 grams per gallon. By way of contrast, it should be noted that carnauba wax emulsion of the same concentration, if prepared using more than about 100 grams of triethanolamine and about 220 grams oleic acid, as a maximum, is too viscous and foamy for practical use.

Applicant has found that, in the case of ouricury wax emulsions prepared with the aid of sodium hydroxide and a fatty acid as hereinabove described, a pH of approximately 9.0 is about optimum. Where the pH is lower than 8.5, the emulsion is apt to be somewhat too thick and viscous in concentrated form. The desired objective can be achieved by suitably adjusting the proportion of alkali metal hydroxide in the formula employed.

The pH of ouricury wax emulsions prepared with the aid of triethanolamine and a fatty acid should most desirably be somewhat lower than where alkali metal hydroxide is employed, the optimum pH being about 8.35.

While the illustrative manufacturing formulae hereinabove given by way of illustrative examples, contain paraffin wax in addition to ouricury wax, it is to be understood that emulsions in which the wax content is ouricury wax only can be similarly manufactured, and that they are likewise of the "dry bright" type, giving a coating of even more brilliant luster or gloss than where paraffin wax is also used.

Where desired, the brilliance of the gloss of the coatings produced by the above described ouricury wax emulsions can be still further enhanced by adding to the formulae about 3 to 5% by weight of a 25% shellac solution.

It is sometimes desirable to employ borax in a diluted or working emulsion of wax for the purpose of inhibiting development of certain forms of decay, such as blue or green mold, on the waxed produce. In order to be effective, it is necessary that the borax be present in a concentration of around 2 or 3 per cent at least. In the case of many wax emulsions, including certain emulsions of carnauba wax, it is possible to incorporate sufficient borax in the emulsion when manufacturing it in the form of an emulsion concentrate of 15 to 18 per cent wax content for example, so that upon diluting the emulsion concentrate to the working concentration of 2 to 4 per cent wax, the resultant working emulsion will contain borax in the desired concentration. This cannot be done in the case of ouricury wax emulsions, however, since adding the necessary proportion of borax in preparing the concentrated emulsion results in a product that is thick and cheese-like. But, after the ouricury emulsion concentrate manufactured as hereinabove described has been diluted to working concentration, it is entirely feasible to add to this diluted emulsion the percentage of borax required for mold inhibiting purposes.

What is claimed is:

1. The process of preparing an aqueous wax emulsion suitable for use in wax-coating fresh vegetable produce, which comprises preparing a hot fluid mixture of waxy material including ouricury wax and a fatty acid, intimately commingling therewith a water solution of an alkaline agent reactive with said fatty acid, and diluting the resultant emulsion to a concentration such that it will remain fluid at ordinary temperatures.

2. The process according to claim 1, further characterized by the fact that the proportion of fatty acid and alkaline agent employed and combined to form an emulsifying soap is greater than is permissible for a carnauba wax emulsion of otherwise similar composition.

3. The process of preparing an aqueous emulsion containing ouricury wax suitable for use in wax-coating fresh vegetable produce, which comprises reacting with a moderately concentrated water solution of caustic soda upon a hot fluid mixture of waxy material consisting preponderantly of ouricury wax, together with a fatty acid, while agitating the reaction mass, said solution of caustic soda being at a temperature not substantially higher than 50° C., and progressively adding more water with continued agitation until the emulsion is at a concentration such that it will remain fluid at ordinary temperatures.

4. The process of preparing an aqueous wax emulsion containing ouricury wax which comprises heating together 18 parts of waxy material consisting proponderantly of ouricury wax, and 7.2 parts oleic acid, to melt the waxes, and stirring to effect thorough blending thereof with the oleic acid, further heating the melt to a sufficiently higher temperature to render it freely fluid, adding to the resultant hot mixture, with continued stirring, an aqueous solution of not less than about 35 parts of caustic soda, and progressively adding more water to the mixture, with continued agitation, until the total quantity employed, including that in the caustic soda solution, amounts to 73.8 parts; the amount of caustic soda employed being such that the pH value of the resultant emulsion does not exceed 10.0; all parts specified being by weight and reasonably approximate.

5. The process of preparing an aqueous wax emulsion containing ouricury wax which comprises heating together 13.5 parts ouricury wax, 4.5 parts paraffin wax, and 7.2 parts oleic acid, to melt the waxes and stirring to effect thorough blending with the oleic acid, further heating the melt to a sufficiently higher temperature to render it freely fluid, adding to the resultant hot mixture, with continued stirring, an aqueous solution of 40 parts of caustic soda, and progressively adding more water to the mixture, with continued agitation, until the total quantity employed including that in the caustic soda solution, amounts to 73.8 parts; all parts specified being by weight and reasonably approximate.

6. The process as set forth in claim 5, further characterized by the fact that the caustic soda solution is prepared with not less than 100 nor as much as 350 parts of water.

7. The process as set forth in claim 5, further characterized by the fact that the caustic soda solution is prepared with 200 parts of water.

8. As a new article of manufacture, an aqueous emulsion of waxy material consisting predominantly of ouricury wax and containing an emulsifying soap suitable for use in wax-coating fresh vegetable produce, said emulsion having a surface tension of from about 28 to about 38 dynes per centimeter and a pH value of from about 8.0 to about 10.0.

9. As a new article of manufacture, an aqueous emulsion suitable for use in wax-coating fresh vegetable produce, which comprises waxy material consisting predominantly of ouricury wax but including a small proportion of paraffin wax, emulsified with oleic acid and caustic soda, in the approximate proportions of 18 parts of waxy material to 7.2 parts of oleic acid and 73.8 parts of caustic soda; said emulsion having a surface tension of from about 28 to about 38 dynes per centimeter, and a pH value of from about 8.5 to 10.0.

10. As a new article of manufacture, an aqueous emulsion suitable for use in wax coating fresh vegetable produce, which comprises waxy material consisting of ouricury wax and paraffin wax, emulsified with oleic acid and caustic soda, in the approximate proportions of 13.5 parts of ouricury wax and 4.5 parts of paraffin wax, to 7.2 parts of oleic acid, and 73.8 parts of caustic soda; said emulsion having a surface tension of around 34 to 36 dynes, and a pH value approximating 9.0.

11. The process of preparing an aqueous emulsion containing ouricury wax suitable for use in wax-coating fresh vegetable produce, which comprises reacting with a water solution of trithanolamine upon a hot fluid mixture of waxy material consisting preponderantly of ouricury wax together with a fatty acid, while agitating the reaction mass, the combined weight of triethanolamine and fatty acid being substantially not less than about 60 per cent of the weight of said waxy material, and progressively adding more water with continued agitation until the emulsion is at a concenrtation such that it will remain fluid at ordinary temperatures.

12. The process of preparing an aqueous wax emulsion containing ouricury wax which comprises heating together 13.5 parts ouricury wax, 4.5 parts paraffin wax, and 7.2 parts oleic acid, and stirring to effect thorough blending thereof with the oleic acid, further heating the melt to a sufficiently high temperature to render it freely fluid, adding to the resultant hot mixture, with continued stirring, an aqueous solution of not less than about 130 parts nor more than about 150 parts of triethanolamine, and progressively adding more water to the mixture, with continued agitation, until the total quantity employed, including that in the caustic soda solution, amounts to 73.8 parts, all parts specified being by weight and reasonably approximate.

13. As a new article of manufacture, an aqueous emulsion of waxy material consisting preponderantly of ouricury wax, suitable for use in wax-coating fresh vegetable produce, said emulsion containing a triethanolamine soap in proportion not substantially less than about 60 per cent by weight of said waxy material, having a surface tension of from about 28 to 38 dynes per centimeter and a pH value of from about 8.0 to 9.0.

14. As a new article of manufacture, an aqueous emulsion suitable for use in wax-coating fresh vegetable produce, which comprises waxy material consisting of ouricury wax and paraffin wax, emulsified with oleic acid and triethanolamine, in the approximate proportions of 13.5 parts of ouricury wax and 4.5 parts of paraffin wax, to 7.2 parts of oleic acid and from about 130 parts to about 150 parts of triethanolamine; said emulsion having a surface tension of around 34 to 36 dynes, and a pH value approximating 8.35.

15. The process of wax-coating fresh vegetable produce which comprises applying to such produce, in a thin coating evenly distributed thereover, an aqueous emulsion of waxy material consisting predominantly of ouricury wax, with an emulsifying soap, said emulsion having a surface tension of from about 28 to about 38 dynes per centimeter and a pH value of from about 8.0 to about 10.0.

16. The process of wax-coating fresh vegetable produce which comprises applying to such produce, in a thin coating evenly distributed thereover, an aqueous emulsion of waxy material consisting predominantly of ouricury wax but including a small proportion of paraffin wax, emulsified with oleic acid and caustic soda, in the approximate proportions of 18 parts of waxy material to 7.2 parts of oleic acid and 73.8 parts of caustic soda; said emulsion having a surface tension of from about 28 to about 38 dynes per centimeter, and a pH value of from about 8.5 to 10.0

17. The process of wax-coating fresh vegetable produce which comprises applying to such produce, in a thin coating evenly distributed thereover, an aqueous emulsion of waxy material consisting of ouricury wax and paraffin wax, emulsified with oleic acid and caustic soda, in the approximate proportions of 13.5 parts of ouricury wax and 4.5 parts of paraffin wax, to 7.2 parts of oleic acid, and 73.8 parts of caustic soda; said emulsion having a surface tension of around 34 to 36 dynes, and a pH value approximating 9.0.

18. The process of wax-coating fresh vegetable produce which comprises applying to such produce, in a thin coating evenly distributed thereover, an aqueous emulsion of waxy material consisting predominantly of ouricury wax emulsified with a triethanolamine soap in proportion not substantially less than about 60 per cent by weight of said waxy material, and having a surface tension of from about 28 to 38 dynes per centimeter and a pH value of from about 8.0 to 9.0.

19. The process of wax-coating fresh vegetable produce which comprises applying to such produce, in a thin coating evenly distributed thereover, an aqueous emulsion of waxy material consisting of ouricury wax and paraffin wax, emulsified with oleic acid and triethanolamine, in the approximate proportions of 13.5 parts of ouricury wax and 4.5 parts of paraffin wax, to 7.2 parts of oleic acid and from about 130 parts to about 150 parts of triethanolamine; said emulsion having a surface tension of around 34 to 36 dynes, and a pH value approximating 8.35.

20. The process of preparing an aqueous wax emulsion concentrate suitable, upon dilution with water, for wax-coating fresh vegetable produce, which comprises providing a hot fluid mixture of waxy material consisting preponderantly of ouricury wax, with a free fatty acid, intimately commingling with said hot fluid mixture a substantially cooler water solution of an alkali metal hydroxide in amount which, in relation to the amount of said fatty acid, is equivalent to employing at least 35 parts of sodium hydroxide to 272 parts of oleic acid, by weight, the concentration of said solution of hydroxide being equivalent to that of 35 parts of sodium hydroxide in from 100 to less than 350 parts of water; and progressively adding more water to the mixture, with agitation, until the resultant emulsion is at a concentration, several times that desirable for application to vegetable produce, such that it will remain fluid at ordinary temperatures; the amount of said alkali metal hydroxide employed being such that the pH value of said emulsion does not exceed 10.0.

CHARLES DE WITT COTHRAN.